(12) United States Patent
Guo et al.

(10) Patent No.: US 9,168,594 B2
(45) Date of Patent: Oct. 27, 2015

(54) TOOLHOLDER WITH EXTERNALLY MOUNTED TUNABLE ABSORBER MASS

(71) Applicant: Kennametal Inc., Latrobe, PA (US)

(72) Inventors: Weiqing Guo, Shanghai (CN); Zhen Cui, Shanghai (CN); Ruy Frota de Souza Filho, Latrobe, PA (US)

(73) Assignee: KENNAMETAL INC, Latrobe, PA (US)

( * ) Notice: Subject to any disclaimer, the term of this patent is extended or adjusted under 35 U.S.C. 154(b) by 274 days.

(21) Appl. No.: 13/974,595

(22) Filed: Aug. 23, 2013

(65) Prior Publication Data
US 2015/0056025 A1   Feb. 26, 2015

(51) Int. Cl.
| B23B 27/02 | (2006.01) |
| B23B 29/02 | (2006.01) |
| B23C 5/00 | (2006.01) |
| B23C 5/26 | (2006.01) |
| B23B 27/00 | (2006.01) |
| B23Q 11/00 | (2006.01) |

(52) U.S. Cl.
CPC ............... *B23C 5/003* (2013.01); *B23B 27/002* (2013.01); *B23B 27/007* (2013.01); *B23C 5/26* (2013.01); *B23B 2226/33* (2013.01); *B23B 2250/16* (2013.01); *B23Q 11/0032* (2013.01); *B23Q 11/0035* (2013.01); *Y10T 408/76* (2015.01); *Y10T 409/304312* (2015.01)

(58) Field of Classification Search
CPC  B23B 29/022; B23B 27/002; B23B 2250/04; B23B 2250/16; B23Q 11/0032; B23Q 11/0035; B23Q 11/0039; B23C 5/003; Y10T 408/76; Y10T 409/304312

USPC .......................................... 408/143; 409/141
See application file for complete search history.

(56) References Cited

U.S. PATENT DOCUMENTS

| 3,522,864 | A | * | 8/1970 | Richter ........................ 188/380 |
| 5,074,723 | A | * | 12/1991 | Massa et al. .................. 409/131 |
| 5,095,786 | A | * | 3/1992 | Bellinghausen et al. ....... 82/112 |
| 6,719,503 | B1 | * | 4/2004 | McCalmont et al. ......... 409/141 |
| 2003/0033873 | A1 | * | 2/2003 | Fischer .......................... 73/462 |
| 2003/0147707 | A1 | * | 8/2003 | Perkowski ..................... 407/30 |
| 2005/0220552 | A1 | * | 10/2005 | Oettle ........................ 408/239 R |
| 2008/0060472 | A1 | * | 3/2008 | Yamamoto ................... 74/571.1 |
| 2012/0099940 | A1 | * | 4/2012 | de Souza Filho ............ 409/131 |
| 2012/0210551 | A1 | | 8/2012 | Yu et al. |

(Continued)

FOREIGN PATENT DOCUMENTS

| CA | 2458232 A1 | * | 3/2003 |
| JP | 05177409 A | * | 7/1993 |

(Continued)

*Primary Examiner* — Daniel Howell
*Assistant Examiner* — Nicole N Ramos
(74) *Attorney, Agent, or Firm* — Larry R. Meenan

(57) ABSTRACT

A toolholder includes an absorber mass externally mounted to a body portion of the toolholder. A spacer is disposed within one or more recesses formed in a bottom wall of the absorber mass. One or more resilient members are disposed between the body portion and the absorber mass, and one or more resilient members are disposed between the absorber mass and the spacer. A clamping bolt passes through each spacer, through the absorber mass and is threaded into the body portion of the toolholder. A rigidity of the one or more resilient members can be selectively adjusted by the clamping bolts so as to tune the absorber mass for optimum dampening of vibration of the toolholder.

13 Claims, 4 Drawing Sheets

(56) References Cited

U.S. PATENT DOCUMENTS

2012/0301240 A1* 11/2012 Jager et al. .................... 408/238
2013/0020093 A1   1/2013 Guidry et al.
2013/0118848 A1* 5/2013 Mischler ....................... 188/379

FOREIGN PATENT DOCUMENTS

| JP | 2002137133 A | * | 5/2002 |
| JP | 2005305600 A | * | 11/2005 |

* cited by examiner

TOOLHOLDER WITH EXTERNALLY MOUNTED TUNABLE ABSORBER MASS

BACKGROUND OF THE INVENTION

1. Field of the Invention

The invention pertains to the field of metal cutting tools. More particularly, the invention pertains to toolholder, such as a turning tool, and the like, with an externally mounted absorber mass to suppress vibrations during metal cutting operations.

2. Description of Related Art

During a metal cutting operation, any vibration between a cutting tool and a workpiece may lead to undesirable cutting performances, such as poor surface finish and out-of-tolerance finished workpieces. Furthermore, such vibration may cause the cutting tool, or the associated machine tool, to become damaged.

To reduce this vibration, cutting speed can be decreased. However, this approach reduces metal removal rates, thereby negatively impacting productivity.

SUMMARY OF THE INVENTION

The problem of dampening vibration in a toolholder is solved by externally-mounting an absorber mass to a body portion of the toolholder in such a way so as to allow the absorber mass to be tuned to optimally dampen vibration.

In one aspect, a toolholder comprises a tool spindle, a cutting head portion for supporting a cutting tool and a body portion disposed between the tool spindle and the cutting head portion. The body portion includes a top wall, a bottom wall, and a pair of opposing side walls. An absorber mass is externally mounted to the body portion of the toolholder. The absorber mass includes a top wall and a bottom wall. The bottom wall has one or more recesses formed therein. A spacer is disposed within each recess formed in the bottom wall of the absorber mass. One or more resilient members are disposed between the body portion and the absorber mass. One or more resilient members are disposed between the absorber mass and the spacer. A clamping bolt passes through each spacer, through the absorber mass and threaded into the body portion of the toolholder. A rigidity of the first and second pairs of resilient members can be selectively adjusted by the clamping bolts so as to tune the absorber mass for optimum dampening of vibration of the toolholder.

In another aspect of the invention, a toolholder comprises a tool spindle, a cutting head portion for supporting a cutting tool, and a body portion disposed between the tool spindle and the cutting head portion. The body portion includes a top wall, a bottom wall, and a pair of opposing side walls. The bottom wall has one or more grooves for receiving one or more resilient members. An absorber mass is externally mounted to the bottom wall of the body portion of the toolholder. The absorber mass includes a top wall and a bottom wall. The bottom wall of the absorber mass includes a plurality of recesses. Each recess has a bottom surface with a groove for receiving one or more resilient members. A spacer is disposed within each recess of the absorber mass. A clamping bolt passes through each spacer, through the absorber mass and threaded into the body portion of the toolholder. A rigidity of the one or more resilient members can be selectively adjusted by the clamping bolt so as to tune the absorber mass for optimum dampening of vibration of the toolholder.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Figure 1:
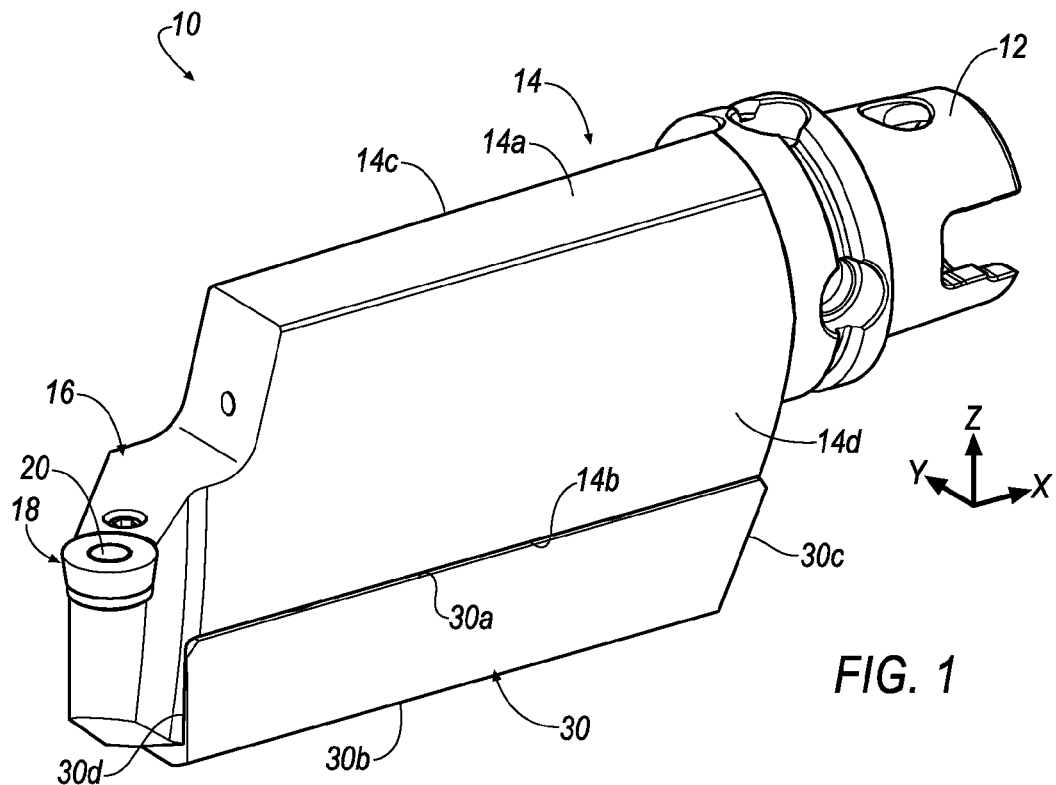
FIG. 1 is a perspective view of a toolholder with an externally mounted absorber mass in accordance with an embodiment of the invention.
Figure 2:
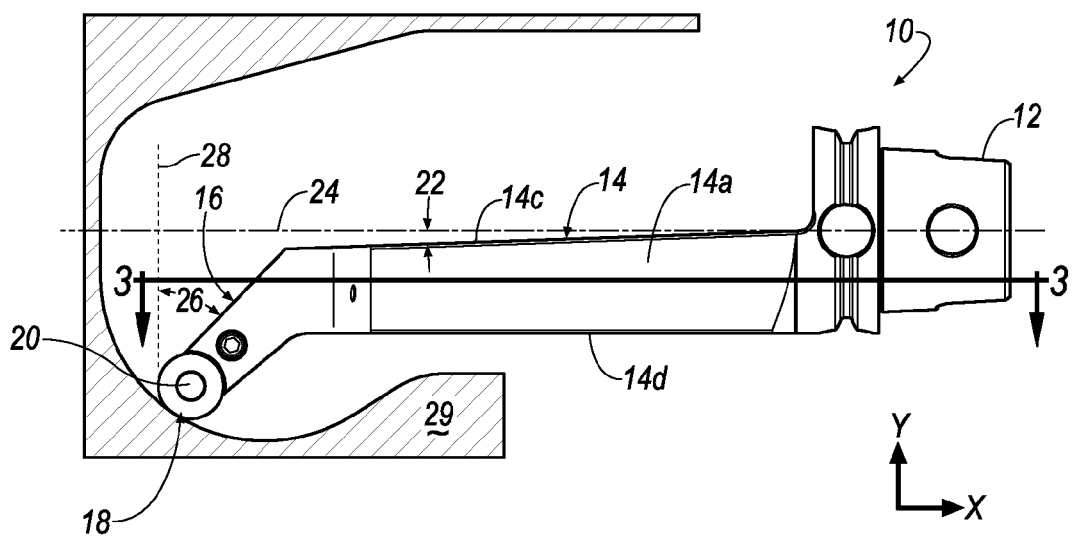
FIG. 2 is a top view of the toolholder of FIG. 1 showing a cutting operation of a workpiece.
Figure 3:
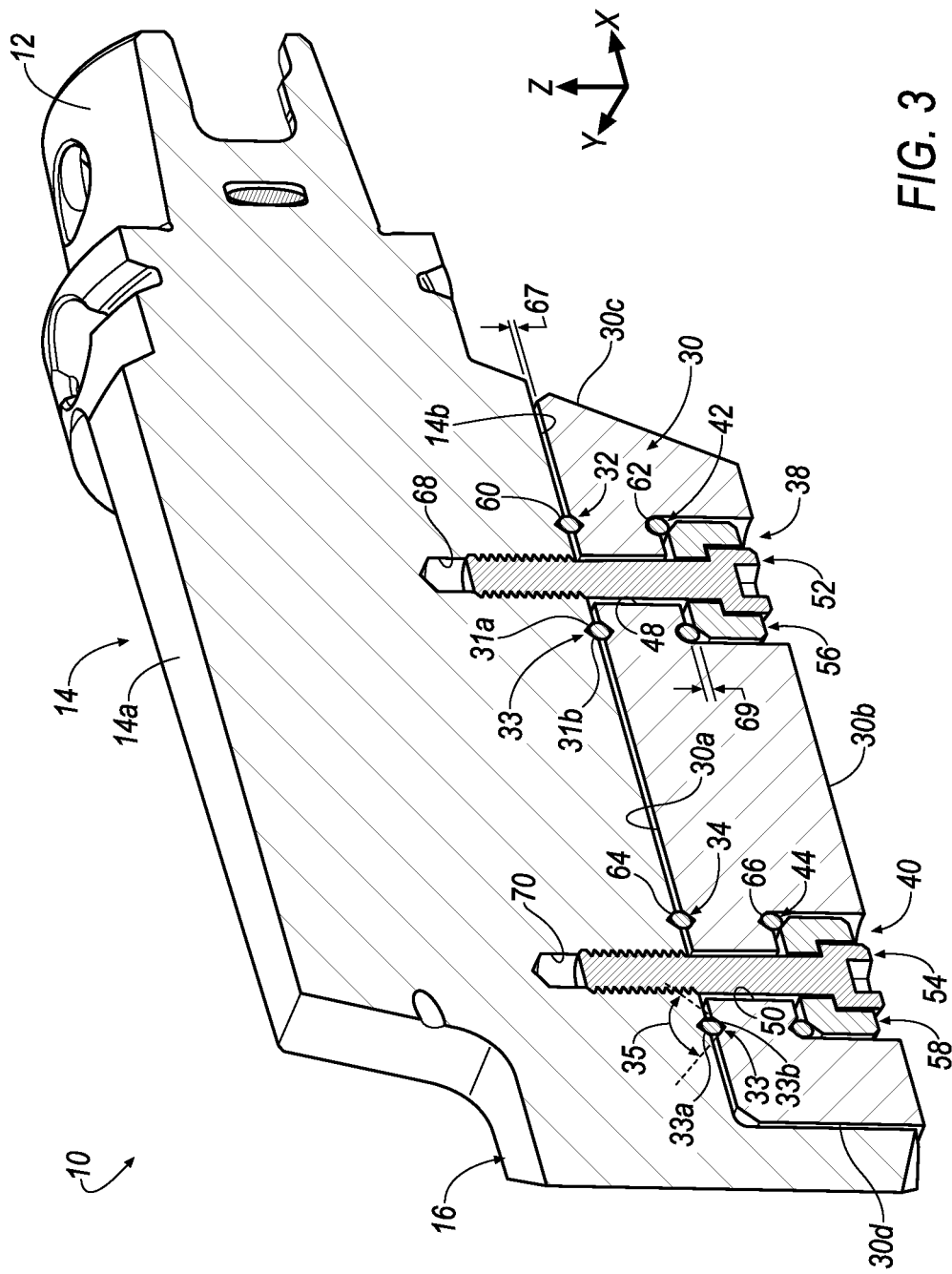
FIG. 3 is a cross-sectional view of the toolholder taken along line 3-3 of FIG. 2.

Referring now to FIGS. 1-3, a toolholder 10 is shown according to an embodiment of the invention. In general, the toolholder 10 includes a tool spindle 12 for retaining the toolholder 10 in a tool rest (not shown). The toolholder 10 includes a body portion 14 disposed between the spindle 12 and a cutting head portion 16. The body portion 14 includes a top wall 14a, a bottom wall 14b opposite the top wall 14a, and a pair of opposing side walls 14c, 14d. The cutting head portion 16 supports a cutting tool 18, such as a cutting insert, and the like, securely retained in the cutting portion 16 by a means well-known in the art, such as a clamping screw 20, and the like. In the illustrated embodiment, the toolholder 10 comprises a cutting tool for turning cutting operations. However, it will be appreciated that the principles of the invention can be applied to other types of cutting tools, such as a milling tool, and the like.

As shown in FIG. 2, the side wall 14c of the body portion 14 is formed at an angle 22 with respect to a central, longitudinal axis 24, or centerline of the toolholder 10. The angle 22 can be, for example, between about zero (0) degrees to about five (5) degrees. In one embodiment, the angle 22 is about two (2) degrees. In other words, the body portion 14 is slightly tapered from the spindle 12 to the cutting head portion 16 in such a way that the thickness of the body portion 14 is greater proximate the spindle and is smaller proximate that cutting head portion 16.

In addition, the cutting head portion 16 is formed at an angle 26 with respect to a plane 28 that is perpendicular to the central, longitudinal axis 24. The angle 26 can be, for example, between about thirty (30) degrees to about sixty (60) degrees. In one embodiment, the angle 26 is about forty-five (45) degrees. Similar to the body portion 14, the cutting head portion 16 can be tapered in such a way that the thickness of the cutting head portion 16 is greater proximate the body portion 14 and is smaller proximate the cutting tool 18. In the illustrated embodiment, the cutting tool 18 comprises a round cutting insert for cutting a workpiece, shown generally at 29. However, it will be appreciated that the invention is not limited to the shape of the cutting insert, and that the principles of the invention apply to other shapes of cutting insert, such as polygonal-shaped cutting inserts, and the like.

As shown in FIG. 3, the bottom wall 14b includes one or more circular grooves 31, 33. In the illustrated embodiment, the bottom wall 14b includes a pair of V-shaped grooves 31, 33 defined by a pair of side walls 31a, 31b, 33a, 33b formed at an angle 35 with respect to each other. The shape of the grooves 31, 33 may be identical to each other. In the illustrated embodiment, the angle 35 formed by the side walls 31a, 31b, 33a, 33b is about ninety (90) degrees. However, it will be appreciated that the angle 35 can be any desirable angle that is sufficient for allowing resilient members to be disposed therein.

One aspect of the invention is that the toolholder 10 includes a tunable absorber mass, shown generally at 30, externally mounted to the body portion 14 of the toolholder 10. The absorber mass 30 is externally mounted in such a way so as to be suspended by resilient members, as discussed below. The absorber mass 30 has a weight that is relatively heavy as compared to the weight of the toolholder 10 without the absorber mass 30. In one embodiment, the absorber mass 30 has a relative weight of about one-half (½) to about one-sixth (⅙) of the weight of the toolholder 10 without the absorber mass 30. In one embodiment, the absorber mass 30 has a weight of about one-fourth (¼) of the weight of the toolholder 10 without the absorber mass 30. For example, the absorber mass 30 could have a weight of about 2.0 lbs, while the toolholder 30 could have a weight of about 8.0 lbs without the absorber mass 30. The absorber mass 30 can be made of the same material as the toolholder 10, or made of a different material having a different density than the toolholder 10, which preferably could be a higher density than the toolholder 10.

Figure 4:
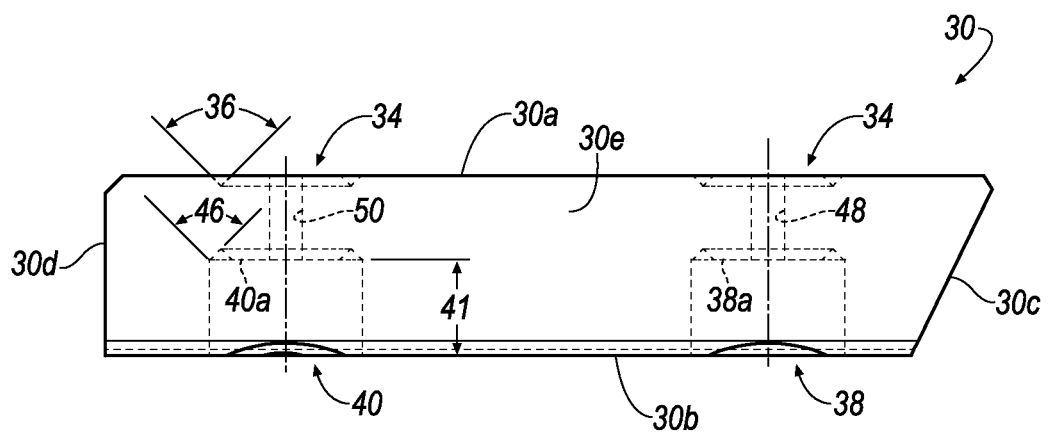
FIG. 4 is side view of the absorber mass according to an embodiment of the invention.
Figure 5:
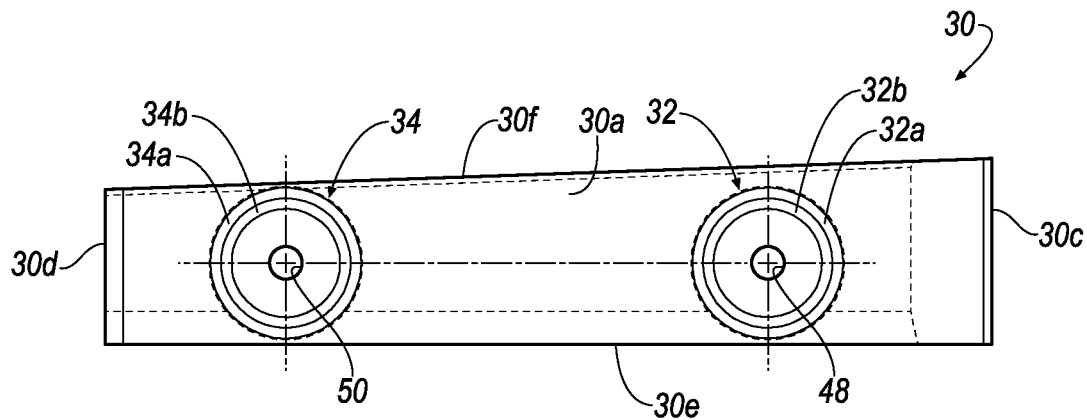
FIG. 5 is a top view of the absorber mass of FIG. 4.
Figure 6:
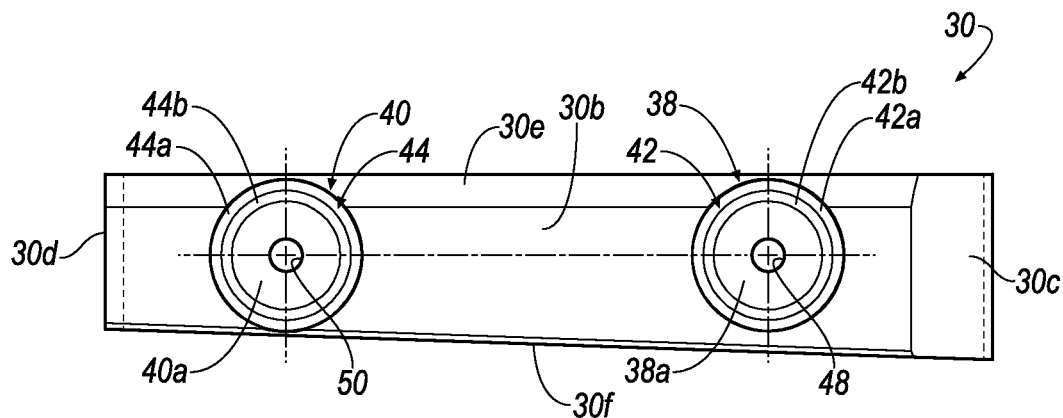
FIG. 6 is a bottom view of the absorber mass of FIG. 4.

Referring now to FIGS. 4-6, the absorber mass 30 is generally rectangular in shape and includes a top wall 30a, a bottom wall 30b opposite the top wall 30a, and first pair of side walls 30c, 30d, and a second pair of side walls 30e, 30f. As shown in FIGS. 5 and 6, the top wall 30a includes one or more circular grooves 32, 34. In the illustrated embodiment, the top wall 30a includes a pair of V-shaped grooves 32, 34 defined by a pair of side walls 32a, 32b, 34a, 34b formed at an angle 36 with respect to each other. The shape of the grooves 32, 34 may be identical to each other. In the illustrated embodiment, the angle 36 formed by the side walls 32a, 32b, 34a, 34b is about ninety (90) degrees. However, it will be appreciated that the angle 36 can be any desirable angle that is sufficient for allowing resilient members to be disposed therein.

In the illustrated embodiment, the distance between the top wall 30a and the bottom wall 30b remains substantially constant along the entire length of the absorber mass 30 between the side walls 30c, 30d. However, it will be appreciated to one skilled in the art that the invention is not limited by the shape of the absorber mass 30. For example, in an alternate embodiment, the absorber mass 30 can have a tapered shape such that the distance between the top wall 30a and the bottom wall 30b decreases from the side wall 30d toward the side wall 30c. In this alternate embodiment, the absorber mass 30 will have a center of mass that is closer to the cutting insert 18 with improved dampening capability as compared to the absorber mass 30 shown in FIG. 1.

The bottom wall 30b includes one or more recesses 38, 40 having a bottom surface 38a, 40a formed at a depth 41 from the bottom wall 30b. Similar to the top wall 30a, the bottom surfaces 38a, 40a include one or more circular grooves 42, 44. In the illustrated embodiment, the top wall 30a includes a pair of V-shaped grooves 42, 44 defined by a pair of side walls 42a, 42b, 44a, 44b formed at an angle 46 with respect to each other. The shape of the recesses 42, 44 may be identical to each other. In the illustrated embodiment, the angle 46 formed by the side walls 42a, 42b, 44a, 44b is about ninety (90) degrees. However, it will be appreciated that the angle 46 can be any desirable angle that is sufficient for allowing resilient members to be disposed therein.

The absorber mass 30 also includes one or more apertures 48, 50 passing through the top and bottom walls 30a, 30b. The absorber mass 30 is externally mounted to the body portion 14 of the toolholder 10 by means of one or more clamping bolts 52, 54, a spacer 56, 58 inserted into a respective recess 38, 40, and a plurality of resilient members 60, 62, 64, 66 positioned within a respective V-shaped groove 32, 34, 42, 44. When externally mounted to the body portion 14 of the toolholder 10, the resilient members 60, 64 provide a gap 67 between the body portion 14 and the absorber mass 30 and a gap 69 between the absorber mass 30 and the spacers 56, 58 to suspend the absorber mass 30 from the body portion 14 of the toolholder 10. The clamping bolts 52, 54 can be threaded into threaded apertures 68, 70 formed in the bottom wall 14b of the body portion 14. The clamping bolts 52, 54 have an unthreaded portion that has a diameter slightly smaller than the diameter of the apertures 48, 50 to provide a gap between the clamping bolts 52, 54 and the absorber mass 30. In one embodiment, the resilient members 60, 62, 64, 66 comprises O-rings made of elastomeric material of a type known in the art. For example, the O-rings 60, 62, 64, 66 can have a hardness of between about 50 and about 70 Shore.

Figure 7:
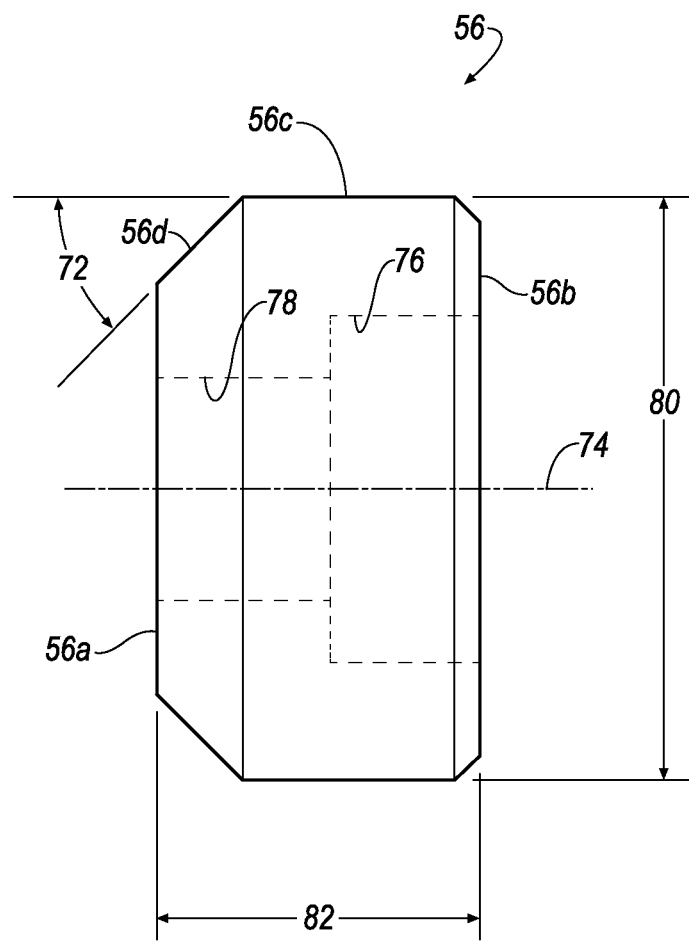
FIG. 7 is a side view of the spacer according to an embodiment of the invention.

Referring now to FIG. 7, the spacers 56, 58 may be identical to each other, and therefore only the spacer 56 is discussed herein for brevity. The spacer 56 is generally circular in shape having a top wall 56a, a bottom wall 56b and a side wall 56c. A chamfer 56d connects the top wall 56a and the side wall 56c and is formed at an angle 72 with respect to a central, longitudinal axis 74 of the spacer 56. In one embodiment, the angle 72 is about forty-five (45) degrees. The chamfer 56d for engages the resilient members 64, 66 disposed between the absorber mass 30 and the spacer 56, 58. The bottom wall 56b includes a recess 76 that is capable of receiving the head of the clamping bolt 52, 54. The spacer 56 also includes an aperture 78 passing through the top wall 56a and the recess 76 formed in the bottom wall 56b that allows the clamping bolt 52, 54 to pass therethrough. The spacer 56 has a diameter 80 that is smaller than the diameter of the recesses 38, 40 formed in the bottom wall 14b of the body portion 14 to enable the spacer 56 to be positioned therein. The spacer 56 has a height 82 that is slightly less than the depth 42 of the recesses 38, 40 to enable the spacer 56 to be disposed within the recesses 38, 40 without projecting outwardly therefrom.

Referring back to FIGS. 1-3, the absorber mass 30 can be assembled to the toolholder 10 by placing the resilient members 60, 64 in the grooves 32, 34 formed in the top surface 30a of the absorber mass 30. The absorber mass 30 can then be positioned such that the resilient members 60, 64 contact the bottom wall 14b of the body portion 14. Then, the resilient members 62, 64 can be placed in the grooves 38, 40 formed in the bottom surface 38a, 40a of the recesses 38, 40 formed in the bottom wall 30b of the absorber mass 30. Next, the spacers 56, 58 can be placed within the recesses 38, 40, and then the clamping bolts 52, 54 can be inserted through the spacers 56, 58 and the absorber mass 30 and threaded into the body portion 14 of the toolholder 10.

The rigidity of the resilient members 60, 62, 64, 66 can be selectively adjusted by the clamping bolts 52, 54 in order to tune the absorber mass 30 for optimum dampening of vibration of the toolholder 10. Specifically, the rigidity of the resilient members 60, 62, 64, 66 can be increased by threading the clamping bolts 52, 54 at a greater distance into the body portion 14. Oppositely, the rigidity of the resilient members 60, 62, 64, 66 can be decreased by threading the clamping bolts 52, 54 at a lesser distance into the body portion 14.

The toolholder 10 with the absorber mass 30 of the invention was tested using a MORI SEIKI NL2500 turning machine at a speed of 143 m/min, a rotational speed of between 583 to 593 rpm, a feed rate of 167 mm/min and a stock diameter of 0.15 mm and 0.50 mm. The testing showed the unexpected results of a near perfect smooth surface with no vibration. Similar testing of a toolholder without the absorber mass 30 produced a badly marred surface due to vibration.

The patents and publications referred to herein are hereby incorporated by reference.

Having described presently preferred embodiments the invention may be otherwise embodied within the scope of the appended claims.

What is claimed is:

1. A toolholder, comprising:
a tool spindle, a cutting head portion for supporting a cutting tool, and a body portion disposed between the tool spindle and the cutting head portion, the body portion including a top wall, a bottom wall, and a pair of opposing side walls;
an absorber mass externally mounted to the body portion of the toolholder, the absorber mass including a top wall and a bottom wall, the bottom wall having one or more recesses formed therein;
a spacer disposed within each recess formed in the bottom wall of the absorber mass;
one or more resilient members disposed between the body portion and the absorber mass;
one or more resilient members disposed between the absorber mass and the spacer; and
a clamping bolt passing through each spacer, through the absorber mass and threaded into the body portion of the toolholder,
wherein a rigidity of the one or more resilient members can be selectively adjusted by the clamping bolt so as to tune the absorber mass for optimum dampening of vibration of the toolholder.

2. The toolholder according to claim 1, wherein the bottom wall of the body portion has a first pair of V-shaped grooves for receiving the one or more resilient members disposed between the body portion and the absorber mass, and wherein the top wall of the absorber mass has a second pair of V-shaped grooves for receiving the one or more resilient members disposed between the body portion and the absorber mass.

3. The toolholder according to claim 1, wherein the bottom wall of the absorber mass includes a pair of recesses, each recess having a bottom surface with a V-shaped groove for receiving the one or more resilient members disposed between the absorber mass and the spacer.

4. The toolholder according to claim 3, wherein the spacer is generally circular in shape having a top wall, a bottom wall, a side wall, and a chamfer connecting the top wall and the side wall for engaging the one or more resilient members disposed between the absorber mass and the spacer.

5. The toolholder according to claim 3, wherein the pair of recesses have a depth that is greater than a height of each spacer.

6. The toolholder according to claim 1, wherein the rigidity of the resilient members is increased by threading the clamping bolts at a greater distance into the body portion, and wherein the rigidity of the resilient members is decreased by threading the clamping bolts at a lesser distance into the body portion.

7. The toolholder according to claim 1, wherein the absorber mass has a weight between one-half to about one-sixth of the weight of the toolholder without the absorber mass.

8. The toolholder according to claim 1, wherein the cutting head portion is formed at an angle with respect to a plane that is perpendicular to a central, longitudinal axis of the toolholder.

9. The toolholder according to claim 1, wherein one of the side walls of the body portion is formed at an angle with respect to a central, longitudinal axis of the toolholder.

10. The toolholder according to claim 1, wherein the absorber mass is externally mounted to the bottom wall of the body portion.

11. A toolholder, comprising:
a tool spindle, a cutting head portion for supporting a cutting tool, and a body portion disposed between the tool spindle and the cutting head portion, the body portion including a top wall, a bottom wall, and a pair of opposing side walls, the bottom wall having one or more grooves for receiving one or more resilient members;
an absorber mass externally mounted to the bottom wall of the body portion of the toolholder, the absorber mass including a top wall and a bottom wall, the bottom wall of the absorber mass including a plurality of recesses, each recess having a bottom surface with a groove for receiving one or more resilient members;
a spacer disposed within each recess of the absorber mass; and
a clamping bolt passing through each spacer, through the absorber mass and threaded into the body portion of the toolholder,
wherein a rigidity of the one or more resilient members can be selectively adjusted by the clamping bolt so as to tune the absorber mass for optimum dampening of vibration of the toolholder.

12. The toolholder according to claim 11, wherein the rigidity of the resilient members is increased by threading the clamping bolts at a greater distance into the body portion, and wherein the rigidity of the resilient members is decreased by threading the clamping bolts at a lesser distance into the body portion.

13. The toolholder according to claim 11, wherein the absorber mass has a weight between one-half to about one-sixth of the weight of the toolholder without the absorber mass.

* * * * *